Aug. 21, 1934.  G. F. MYERS  1,970,812
AIRCRAFT
Original Filed March 13, 1929   3 Sheets-Sheet 1
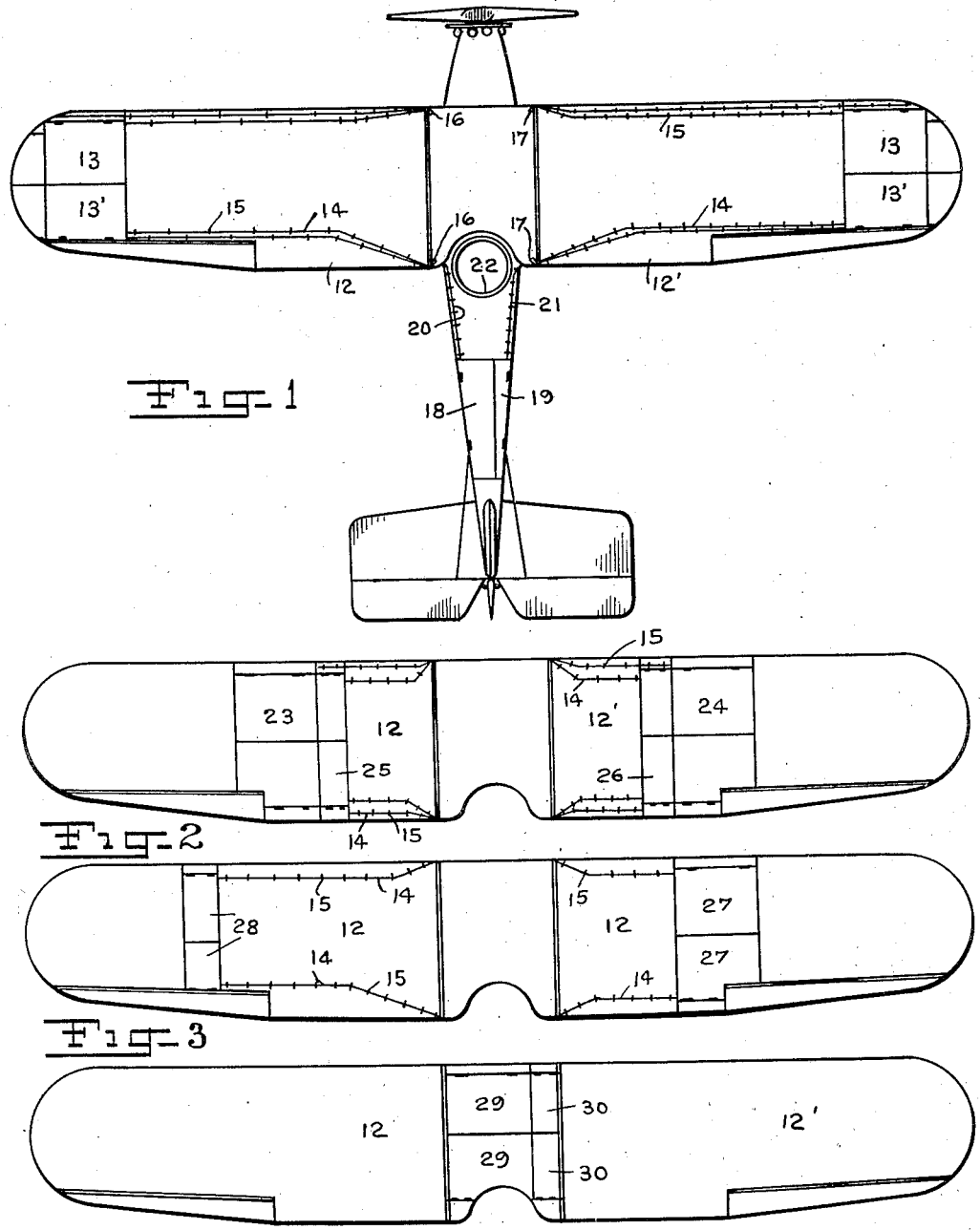

Aug. 21, 1934.     G. F. MYERS     1,970,812
AIRCRAFT
Original Filed March 13, 1929     3 Sheets-Sheet 2
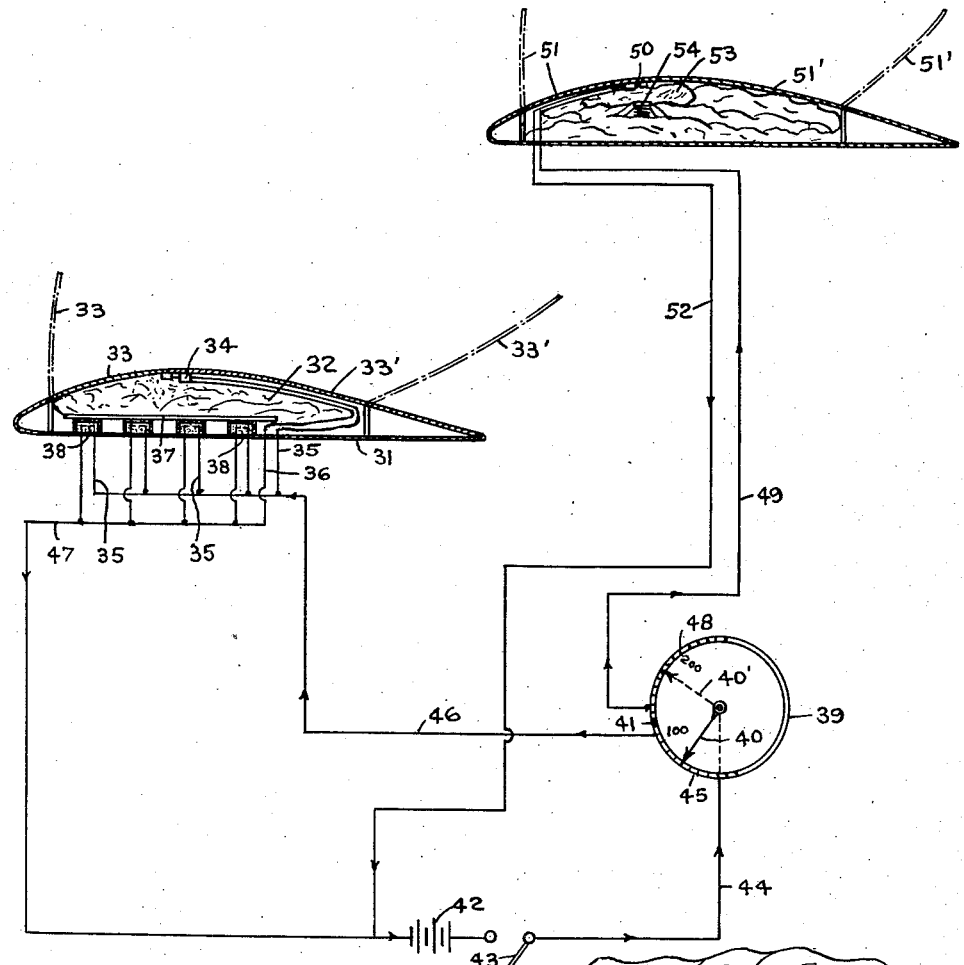
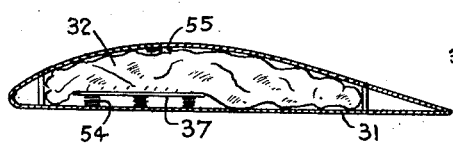
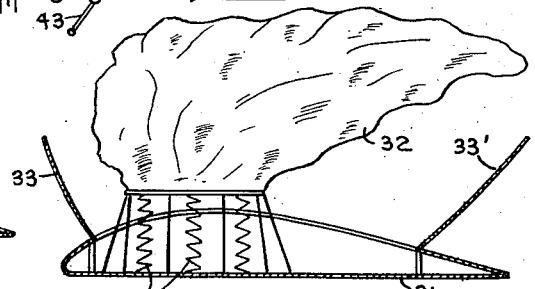

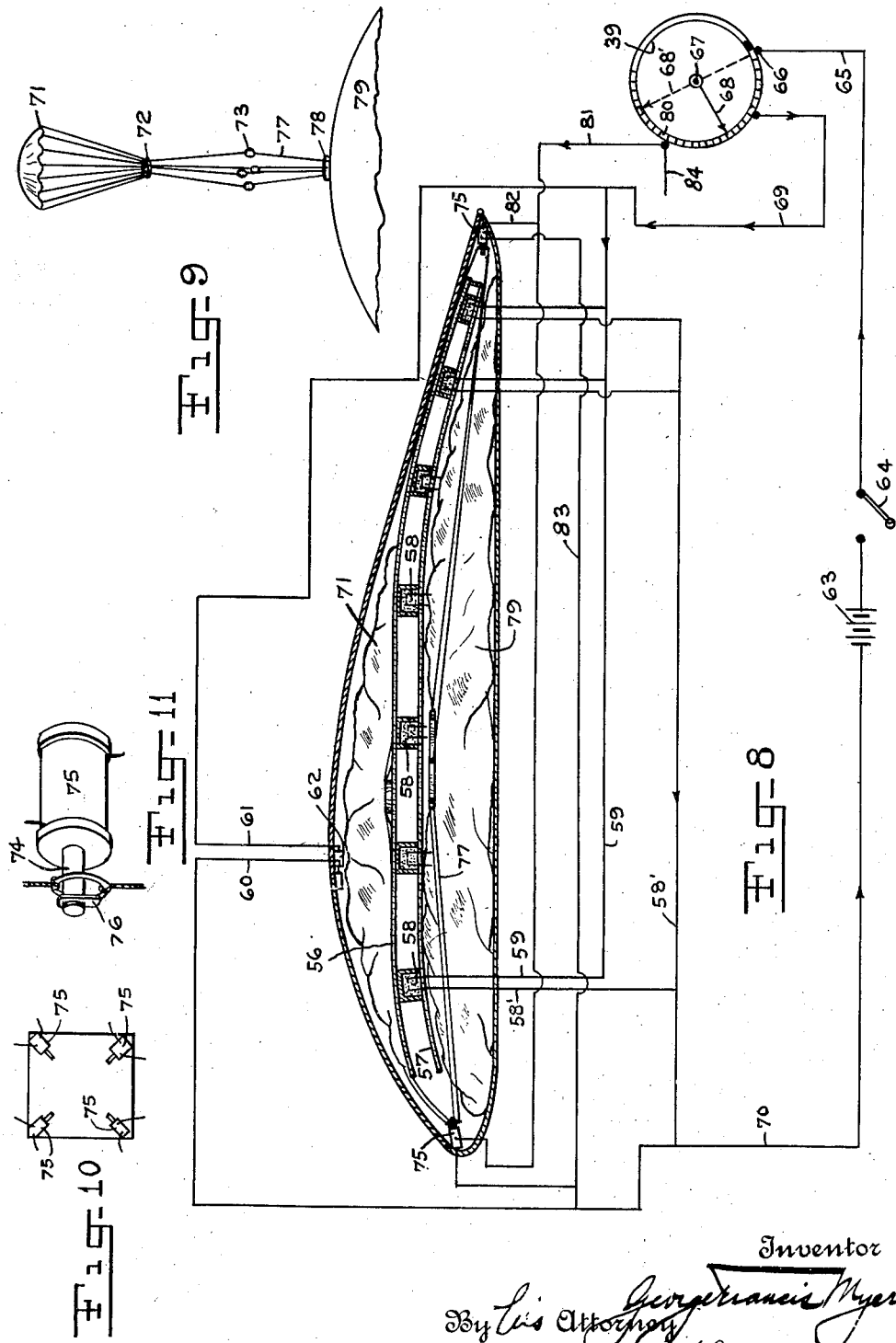

Patented Aug. 21, 1934

1,970,812

UNITED STATES PATENT OFFICE 1,970,812

AIRCRAFT

George Francis Myers, Jackson Heights, N. Y.

Application March 13, 1929, Serial No. 346,533
Renewed August 27, 1932

6 Claims. (Cl. 244—21)

My invention relates to improvements in aircraft and more particularly has reference to and is illustrated in the accompanying drawings in its application to means, in combination with the aerofoil of an aeroplane, for carrying one or more parachutes, and means for discharging and inflating the same substantially automatically, according to the altitude of the craft at the time the parachute is released.

Referring to said drawings, Fig. 1 illustrates in plan view, a suitable form of aeroplane showing an embodiment of my invention. Figs. 2, 3, and 4 illustrate plan views of aerofoils embodying modifications of the invention disclosed in Fig. 1. Fig. 5 illustrates an aerofoil in cross section, showing discharging or ejecting means in combination with an altimeter, including the wiring circuit therefor. Fig. 6 illustrates in cross section an aerofoil with parachute therein, and mechanical ejecting means therefor. Fig. 7 is a similar view showing the mechanism in Fig. 6 in action. Fig. 8 is an enlarged detail in cross section, showing two parachutes within an aerofoil, and the ejecting means including electrical circuits and altimeter for operating the same. Fig. 9 shows the same in ejected form, upon a reduced scale. Fig. 10 shows in plan view, the method of anchoring the smaller parachute, and Fig. 11 illustrates in perspective, upon an enlarged scale, the particular bolt releasing mechanism for holding and releasing the smaller parachute.

12, 12' indicate the aerofoils of a flying machine or aeroplane. At the lateral extremities of the wings shown in Fig. 1, is a box or chamber similar to that shown in Fig. 8. In other words, the top of the aerofoil is provided with a pair of hinged covers 13, 13' leading into the interior of the aerofoil, which serves as a chamber or receptacle for one or more parachutes. From the parachutes, the supporting cables extend along the top surface of the aerofoil as indicated at 14, and are held in position by suitable strips such as 15, which, when the parachutes are released, are readily broken loose, allowing the cables to release themselves until the ends anchored at 16, 17 are reached. In the form shown in Fig. 1, there would be two parachutes, one at the right end of the wing, and the other at the left end of the wing, the one at the right, when released, pulling from the points 17 and the one at the left, when released, pulling from the points 16. These are the four main strut points in the construction, and the aeroplane suspended from those points will remain in normal balanced condition.

If desired, further provision may be made in the chassis of the aeroplane for other parachutes. For instance, a hinged cover 18 may be provided to inclose a larger parachute, and the smaller cover 19 may be provided to house a smaller parachute, the latter serving as a pilot chute, if desired. If separately usable, the cables 20, 21 serve to anchor these parachutes at either side of the cockpit 22, as shown.

In the modification shown in Fig. 2, these parachutes are shown housed further inwardly towards the center of the machine as indicated by the hinged doors 23, 24, for the larger parachutes, and 25, 26 for the smaller parachutes.

In the modification shown in Fig. 3, a larger parachute may be housed beneath the hinged doors 27, and a smaller chute between the hinged doors 28, further laterally, the smaller chute being further from the center line of the chassis or fuselage and being intended to balance the weight of the larger chute that is located nearer to the said center line on the opposite side thereof.

In the modification shown in Fig. 4, the larger chute may be housed beneath the doors 29, and a smaller chute beneath the doors 30, the smaller chute serving as a pilot chute, if desired.

Referring now more particularly to Fig. 5, it will be observed that an aerofoil 31 is provided with a parachute 32 beneath the hinged doors 33, 33', these doors being held closed by a suitable catch 34, adapted to be released by the electrical circuit 35, 36. Beneath the chute is an asbestos board 37, resting upon the top of cartridges 38, which may contain any suitable rapidly expanding medium such as compressed air, explosive or the like. 39 indicates an altimeter having an indicating finger 40, which contacts with the metallic periphery, as shown, said metallic periphery being separated by insulating material as indicated at 41. 42 indicates a battery or suitable source of electrical current controlled by a switch 43, so that, when the switch is closed, the current from the battery, passes rightwardly through the circuit 44, to the hand 40, and into the peripheral contact ring 45, which is divided in feet, showing the altitude of the craft by the hand 40. From the contact 45, the current passes outwardly through the circuit 46, several circuits 35, where it operates the cartridges 38, returning by way of the circuit 47, to the battery 42. The circuit 35, 36, at the same time, releasing the doors 33, 33', the rapid expansion of the material within the cartridges 38 immediately blows the parachute into the air, where it instantly becomes effective, the same being anchored to the machine preferably at the main strut points 16, 17. This operation is within say one hundred feet altitude. Where the altitude is above one hundred feet, as shown on the meter 39, the hand would be in the position shown at 40', whereupon, the current from the battery by way of the circuit 44, would travel through the hand 40', and peripheral contact 48, through the circuit 49 to the door catch 50, releasing doors 51, 51', and returning by circuit 52, to the battery. In this case, a pilot chute 53 may be first ejected by a spring 54, held under compression by the closed doors 51, 51', and being attached to the top of the main parachute, thus immediately pulls the main parachute after it, fully inflating the same, to catch the descent of the machine in time to salvage the same.

In the modification shown in Fig. 6, instead of using cartridges of rapidly expanding material beneath the asbestos board 37, springs 54 may be used for ejecting the board and the parachute 32, any suitable means being employed for simultaneously releasing the catch 55. The action of the springs and ejection of the chute, are shown to better advantage in Fig. 7.

In the modification shown in Fig. 8, two doors, preferably of non-combustible material, are indicated at 56, 57 and between them, cartridges 58 of rapidly expanding material which may be ignited or set in operation by the circuit 58', 59. At the same time, the circuit 60, 61 is also energized for operating the door release 62. For this purpose, a battery 63 and switch 64 are provided, the current passing through the circuit 65, and binding post 66 of the altimeter 39, passing to the bearing 67 of the needle, and through the needle 68 to the circuit 69, where it passes to the door release 62, and back again by way of the circuit 70, to the battery, at the same time, charging the cartridge circuits 59 and returning by way of the circuit 58', to the battery. This serves to discharge the pilot chute 71, shown in action in Fig. 9.

The cables from this pilot chute pass through the ring 72, to each of the rings 73, each of the four of which are penetrated by a bolt 74, which may be withdrawn by the magnet 75, when the latter is energized, said bolt, when projected, extending into a housing 76, by a suitable compression spring. These bolts are located at the points of the main struts as indicated in Fig. 10, and unless these bolts are operated, the smaller chute 71 alone, is operated and serves to check the descent of the machine, holding the same at the main struts by being engaged upon the bolts 74, the same having been ejected by the cartridges 58. To the rings 73, is also secured smaller cables 77, which are connected with the ring 78 at the top of the larger chute 79, and if the altitude is sufficiently high, so that the needle contacts with the section 80 of the altimeter, the current flows by way of the circuit 65, through the needle shown in dotted line position at 68' and section 80, by way of the circuit 81 and 82, to the bolts 74, withdrawing the same and returning by way of the circuit 83, and circuit 70, to the battery, thereby releasing the larger parachute 79, which is immediately drawn upward into action by the smaller chute 71, thus further supporting and breaking the descent of the machine. The circuit 84 is indicative of a parallel and independent circuit for the cartridges and for the door release so that these may also be actuated whenever contact is made through the altimeter section 80. It will be understood that the individual sections of the altimeter are insulated from each other.

In other words, if the airplane is at such an altitude that the hand 68 of the altimeter is above the section 80 and the plane should start to fall, as the hand 68 contacts with the section or sections 80, the door will be released, the cartridge will be exploded and the locks 75 will be released so that both the small and the large parachutes will be ejected and the airplane be supported in its fall. If the hand 68 of the altimeter is below the sections 80, then there would be insufficient time for the large parachute to become inflated and it is only desirable to eject the small parachute and let it become fully effective in breaking the fall.

Of course it is understood that various modifications may be made in the construction and arrangement of parts without departing from the spirit of the invention as claimed.

I claim:

1. In combination with an aircraft, parachutes therefor, and means for releasing the same, an altimeter, and means in combination therewith for selectively releasing said parachutes when said releasing means is operated.

2. In combination with an aircraft, an altimeter and parachutes therefor, and means in combination therewith, for selectively releasing said parachutes, according to the predetermined altitudes of said craft.

3. In combination with an aircraft, of chambers in close proximity to the lateral extremities thereof for housing parachutes, means for anchoring the parachute adjacent the main struts of the craft, means for releasing the parachutes, an altimeter, and means in connection therewith for selectively releasing the parachutes when the releasing means is operated.

4. In combination with an aircraft, of an airfoil, a pair of parachutes, means for housing one of the parachutes between the tip of the airfoil and the longitudinal center line of the machine, and means on the other side of the line for housing a smaller parachute, means for releasing the parachutes, an altimeter, and means in combination therewith for selectively releasing the parachutes when the releasing means is operated.

5. In combination with aircraft, of a pair of superposed parachutes, means for forcibly ejecting the uppermost parachute, and a pair of mats mounted between the parachutes and on each side of the said means.

6. In combination with an aircraft, of a parachute capable of landing a disabled craft safely on the earth from a short distance up in the air, a larger parachute set into action by the first mentioned parachute and capable of landing the disabled craft on the earth safely from a great distance up in the air, and means for selectively operating the parachutes.

GEORGE FRANCIS MYERS.